United States Patent
Griffiths

(10) Patent No.: US 7,104,561 B1
(45) Date of Patent: Sep. 12, 2006

(54) AIR SPRING

(75) Inventor: Paul J. Griffiths, Chester (GB)

(73) Assignee: Meritor HVS Limited, (GB)

( * ) Notice: Subject to any disclaimer, the term of this patent is extended or adjusted under 35 U.S.C. 154(b) by 1292 days.

(21) Appl. No.: 09/525,741

(22) Filed: Mar. 14, 2000
(Under 37 CFR 1.47)

(51) Int. Cl.
*B60G 11/27* (2006.01)

(52) U.S. Cl. .............................................. 280/124.157

(58) Field of Classification Search ......... 280/124.116, 280/124.157, 124.162; 267/64.27
See application file for complete search history.

(56) References Cited

U.S. PATENT DOCUMENTS

| | | | | |
|---|---|---|---|---|
| 3,599,954 A | * | 8/1971 | Yew ............................. | 267/34 |
| 3,913,940 A | * | 10/1975 | Bates ........................ | 280/124 R |
| 4,029,305 A | * | 6/1977 | Schubert et al. ........... | 267/65 R |
| 4,890,823 A | * | 1/1990 | Koschinat et al. ........ | 267/64.27 |
| 5,058,916 A | | 10/1991 | Hicks | |
| 5,127,641 A | * | 7/1992 | Schneider ................ | 267/64.27 |
| 5,234,203 A | * | 8/1993 | Smith ......................... | 267/131 |
| 5,346,247 A | | 9/1994 | Snyder | |
| 5,351,986 A | | 10/1994 | Hedenberg et al. | |
| 5,364,086 A | * | 11/1994 | Paton ....................... | 267/140.4 |
| 5,403,031 A | | 4/1995 | Gottschalk et al. | |
| 5,655,788 A | | 8/1997 | Peaker | |

FOREIGN PATENT DOCUMENTS

EP       554573 A2    8/1993
EP       742113 A1   11/1996

* cited by examiner

*Primary Examiner*—Lesley D. Morris
(74) *Attorney, Agent, or Firm*—Carlson, Gaskey & Olds

(57) ABSTRACT

An air suspension system includes an air spring having an air cell and a piston. Preferably, the air cell tightly conforms to the piston and has a frustro-conical tapered configuration. By providing a tight conformal fit between the piston and the air cell, and by expanding the diameter of the air cell therefrom, the likelihood that the air cell will invert is substantially decreased. Similarly, when the air cell is deflated the taper facilitates the air cell obtaining the original rolled or deflated position. In another embodiment, the damper slows the extension of the longitudinal member to provide more time for an anti-vacuum system to equalize the pressure within the air cell.

6 Claims, 2 Drawing Sheets

AIR SPRING

BACKGROUND OF THE INVENTION

The present invention relates to an air suspension, and more particularly to an improved air cell for an air spring.

A common air suspension system typically comprises a chassis of a vehicle and a longitudinal member extending generally lengthwise of the vehicle for pivoting about an axis generally transverse of the vehicle. The longitudinal member carries an axle having one or more road wheels. An air spring having a piston and an air cell is mounted spaced from the axis and acts as an adjustable compression spring between the vehicle and the longitudinal member to bias the wheels for effective road engagement and to buffer axle and wheel vibration.

Vehicles fitted with an air suspension are sometimes used without being inflated such as when being transported on railroad cars. At other times the vehicle axles are left to hang away from the chassis in an unloaded condition on the wheels such as when the vehicle is lifted on and off a ship. These operations cause the air spring to extend without air and pull away from the piston causing the air cell to "snap through" or invert. Once the air cell inverts, the air spring may have difficulty being correctly inflated. Further, if a load is again placed on the suspension while the air cell is inverted, the air spring is compressed and the air cell may become trapped between the piston and upper mounting resulting in damage to the air cell.

Accordingly, it is desirable to provide an improved air spring for a vehicle air suspension which minimizes the possibility of air cell inversion.

SUMMARY OF THE INVENTION

The air spring according to the present invention includes a tapered air cell and a piston which act as a compression spring between a longitudinal member and a chassis component.

The air spring is powered by the piston driven by a gas feed connected to the vehicle air supply. A bottom of the piston is attached to the longitudinal member and the top of the piston is attached to the air cell. The air cell has a first end attached to the top of the piston and a second end attached to the chassis component by a bearing plate. Preferably, the air cell tightly fits the piston at the first end and expands in diameter to meet the bearing plate.

When activated, the piston introduces air into the air cell and the air cell expands and unrolls from the piston. Accordingly, as the air cell first end has a smaller diameter than the second end, the air cell forms a tapered shape when fully extended. By providing a tight fit between the piston and air cell and by tapering the air cell, the likelihood that the air cell will invert is substantially decreased. Similarly, when the air cell is deflated, the taper facilitates the air cell in obtaining the original deflated or rolled position.

In another embodiment, the longitudinal member is only allowed to extend away from the chassis at a speed allowed by a damper extension force. An anti-vacuum system is thus provided with more time to equalize the pressure within the air cell.

As a result of the improved rolling and unrolling of the tapered air cell and the additional time provided by the damper, the possibility of inversion is minimized. The present invention therefore provides an inexpensive air cell which decreases the inversion problem and can be readily installed to existing suspension systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
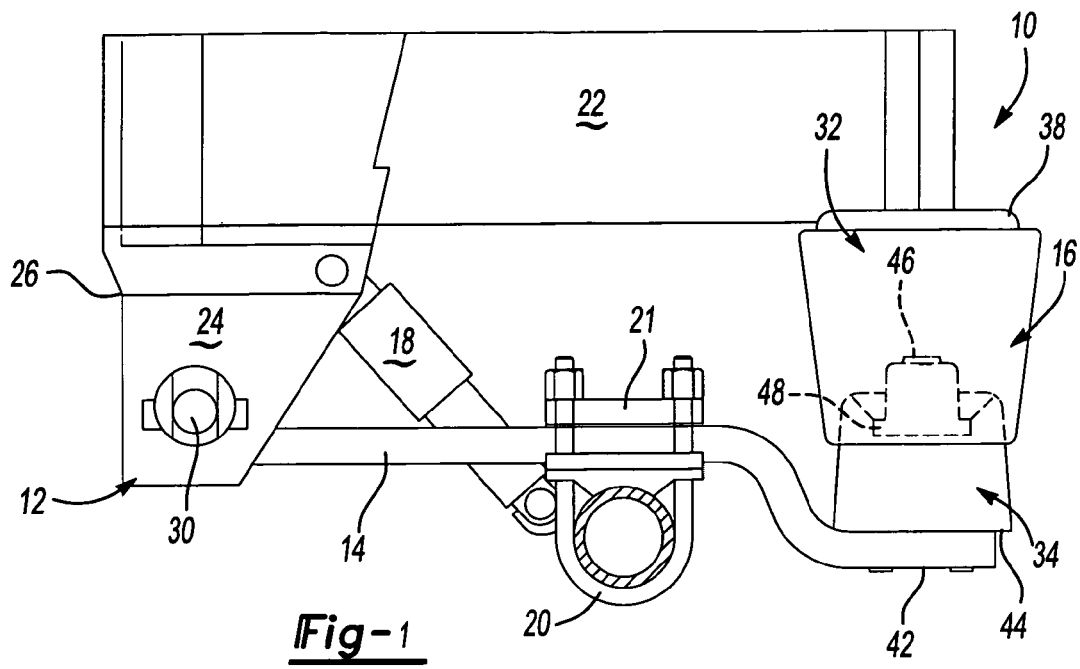
FIG. 1 is a general side view of a vehicle suspension system according to the present invention.

FIG. 1 illustrates an air suspension system 10 for a vehicle. The system 10 generally includes a bracket 12, a longitudinal member 14, an air spring 16, a damper 18 and an axle assembly 20. The system is fixed to a chassis component 22 of the vehicle, shown schematically.

The disclosed bracket 12 has side members 24 which depend from the chassis, and a front plate 26 interconnecting the side members 24. The bracket 12 thus has a box-like construction, however, one skilled in the art will understand that other bracket configurations would benefit from the present invention.

The longitudinal member 14 extends generally lengthways of the vehicle and is pivotally connected within the bracket 12 to a pivot 30. The pivot 30 permits movement of the longitudinal member 14 and defines an axis generally transverse of the vehicle. From the pivot 30, the longitudinal member 14 extends rearwardly to mount the air spring 16. An axle assembly 20 of the vehicle is secured to the longitudinal member 14 between the pivot 30 and the air spring 16 by a clamp 21. A telescopic suspension damper 18 interconnects the axle assembly 20 and the bracket 12.

The air spring 16 includes an air cell 32 and a piston 34 which act as a compression spring between the longitudinal member 14 and the chassis component 22 to bias the road wheels (not shown) for effective road engagement and to buffer the vehicle against axle and wheel vibration. The air spring 16 is attached to the chassis component 22 by a mounting plate such as a bead plate 38. It is to be understood that the term air spring as used herein is not intended to be construed narrowly and should be taken to include bellows, air bags, and so forth.

Figure 2:
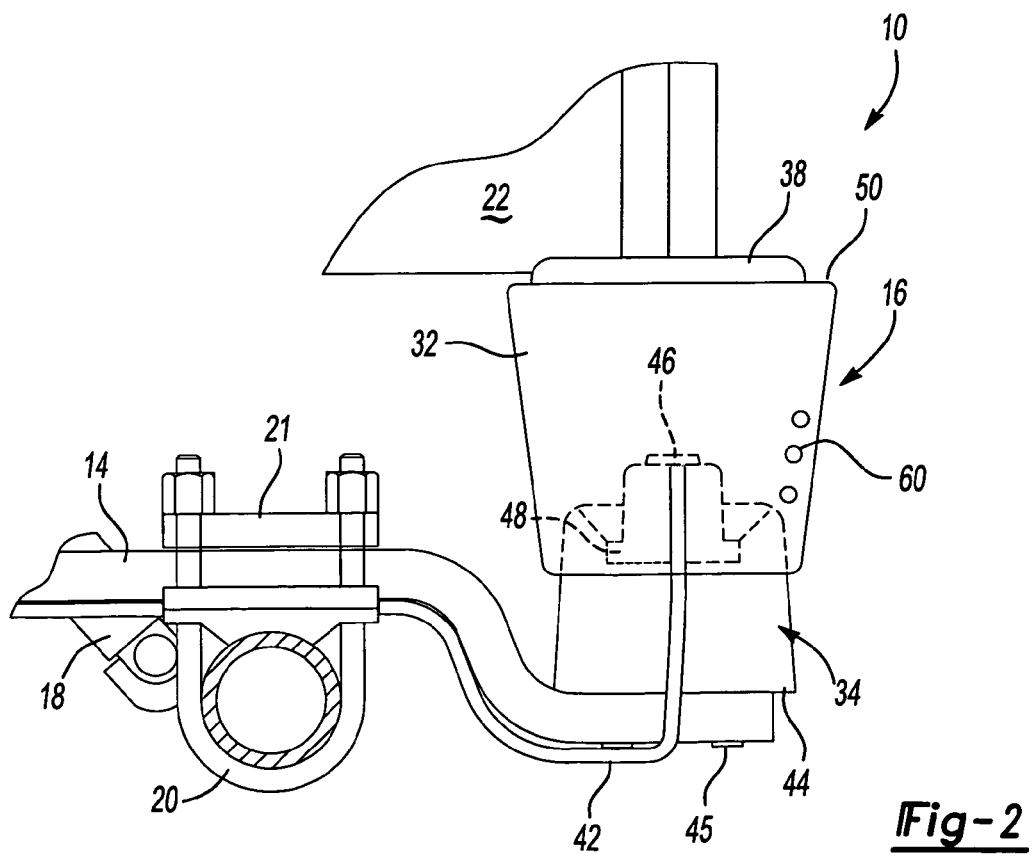
FIG. 2 is a sectional view of the air spring of FIG. 1 according to the present invention.

As further shown in FIG. 2, the air cell 32 is powered by the piston 34 which is driven by a gas feed 42 connected to the vehicle air supply (not shown.) A bottom 44 of the piston 34 is attached to the longitudinal member 14 by bolts 45 or the like. A top 46 of the piston 34 is attached to the air cell 32. Preferably, the gas feed 42 extends along the longitudinal member 14 and enters the bottom 44 of the piston 34. Accordingly, the gas feed 42 is located in a protected location along the longitudinal member 14 which provides an efficient route to the piston 16.

Figure 3A:
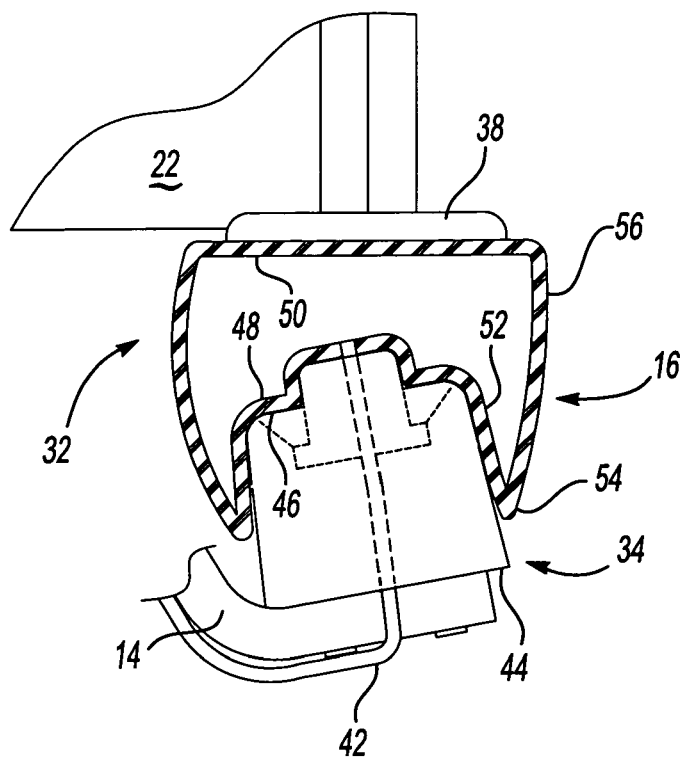
FIG. 3a is a section view of the air spring of FIG. 2.

Referring to the sectional view of FIG. 3a, the air cell 32 is a substantially tubular rubber member having a first end 48 and a second end 50. The first end 48 is attached to the top 46 of the piston 34. A first portion 52 extends from the first end 48 and fits along the piston 34 toward the longitudinal member 14. Preferably, the first portion 52 of the air cell 32 tightly conforms to the piston 34. The first portion 52 substantially follows the length of the piston 34 until it folds over at an intermediate point 54. The intermediate point changes with piston movement. A second portion 56 extends from the intermediate point 54 and overlays the first portion 52 as it extends toward the chassis 22. The second portion 56 increases in diameter and extends to the second end 50 which is preferably attached to the bearing plate 38 mounted to the chassis 22. Although the air cell 32 has been described in a multiple of separate portions it should be realized that this is for descriptive purposes only and that the air cell 32 is a continuous member.

Figure 3B:
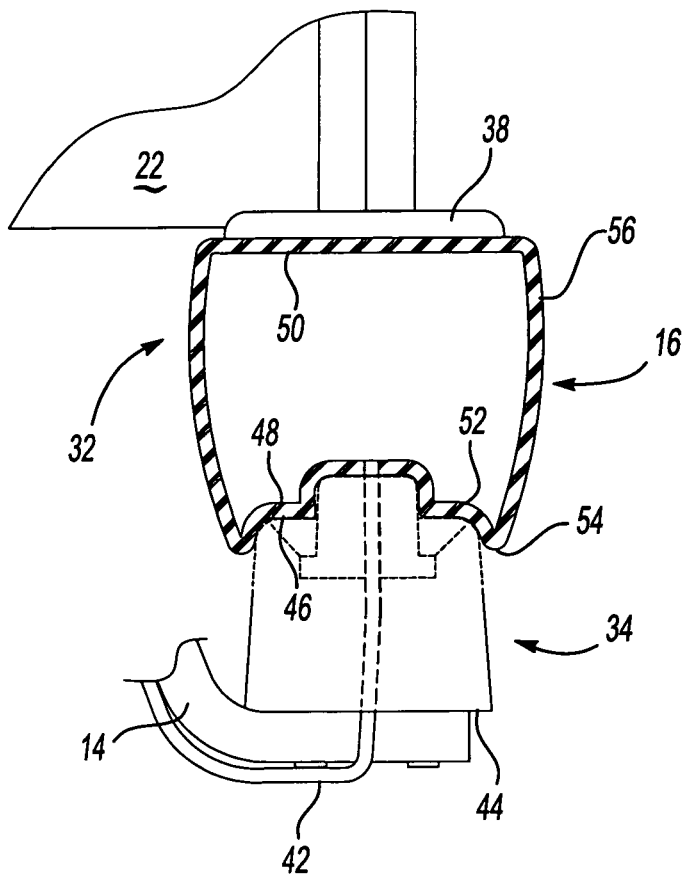
FIG. 3b shows a view similar to FIG. 3a after inflation of the spring.

In operation, air is exhausted or introduced into the air cell 32 such that the air cell 32 expands and unrolls from the piston 34. As the air cell 32 first end 48 has a smaller diameter than the second end 50, the air cell 32 has a tapered or frustro-conical shape when fully inflated. By comparing FIGS. 3a and 3b one can see the movement of the air spring between deflated and inflated positions. By providing a tight conformal fit between the piston 34 and the first end 48, and by providing a conical air cell 32 shape, the likelihood that the air cell 32 will invert is substantially decreased. Similarly, when the air cell 32 is deflated the taper facilitates the air cell 32 obtaining its original rolled or deflated position. As a result of the improved rolling and unrolling of the tapered air cell, the likelihood of inversion or "snapping through" is therefore minimized.

In a second feature of the present invention, the damper 18 includes a negative force characteristic. The damper 18 interconnects the axle assembly 20 and the chassis 22. The damper 18 is mounted between axle 20 and chassis 22 to provide a dampening force to the axle assembly 20 as is known. Preferably, when the suspension system 10 is unloaded the damper 18 slows the unloaded movement of the longitudinal member 14. This allows the axle assembly 20 to fall away from the chassis 22 at a controlled rate. The controlled rate provides additional time for an anti-vacuum system (shown schematically at 60 in FIG. 2) to operate.

The anti-vacuum system 60 includes or more orifices having one-way valves that equalize the pressure within the air cell 16 with the surrounding atmospheric pressure if a vacuum condition occurs. When the air cell 32 is pressurized by the gas feed 42, the air cell 16 is at a pressure higher than atmospheric pressure and the orifices remain closed. If a vacuum condition occurs, the orifices open to equalize the pressure.

However, if the unloaded longitudinal member 14 quickly pivots away from the chassis 22, extension of the air cell 16 overwhelms the anti-vacuum system 60. The air cell 16 can then become inverted as the vacuum condition forms within the air cell 16. This typically happens when the longitudinal member 14 falls away from the chassis 22 when the vehicle is lifted. Accordingly, the damper 18 prevents the axle assembly 20 from extending away from the chassis 22 at a speed which overwhelms the anti-vacuum system 60. The anti-vacuum system 60 is thus provided with more time to equalize the pressure within the air cell 16. This further prevents the likelihood of inversion.

The present invention therefore provides an inexpensive air cell with improved rolling and unrolling characteristics while being readily installable to existing suspension systems.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air spring for a vehicle air suspension system comprising:
   a piston attached to a longitudinal member pivotally attached to a chassis component for pivotal movement about an axis; and
   a deformable air cell having a first end attached to said piston and a second end attached to said chassis component, said second end having a greater diameter than said first end, said piston moving to deform said deformable air cell.

2. The air spring as recited in claim 1, wherein said air cell is tapered between said first end and said second end.

3. The air spring as recited in claim 1, wherein said air cell is of a frustro-conical configuration.

4. An air suspension system for a vehicle comprising:
   a longitudinal member pivotally attached to a chassis component for pivotal movement about an axis;
   an axle assembly mounted to said longitudinal member; and
   an air spring having a frustro-conical air cell and a piston, said air spring disposed between said longitudinal member and said chassis component, said air cell having a first end attached to said piston and a second end attached to said chassis component.

5. The system as recited in claim 4, wherein said air cell includes an anti-vacuum system and a damper disposed between said axle assembly and said chassis component, said damper extendable at a rate which allows said anti-vacuum system to equalize a pressure within said air cell with atmospheric pressure as said longitudinal member pivots about said axis away from said chassis component.

6. An air suspension system for a vehicle comprising:
   a longitudinal member pivotally attached to a chassis component for pivotal movement about an axis;
   an axle assembly mounted to said longitudinal member;
   air spring having a deformable frustro-conical air cell and a piston, said air spring disposed between said longitudinal member and said chassis component, said air cell having a first end attached to said piston and a second end attached to said chassis component;
   an anti-vacuum system within said air spring, said anti-vacuum system operable to equalize a pressure within said air cell with atmospheric pressure as said longitudinal member pivots about said axis away from said chassis component; and
   a damper disposed between said axle assembly and said chassis component, said damper extendable at a rate which allows said anti-vacuum system to equalize a pressure within said air cell with atmospheric pressure as said longitudinal member pivots about said axis away from said chassis component and said piston moving to deform said deformable air cell.

* * * * *

UNITED STATES PATENT AND TRADEMARK OFFICE
CERTIFICATE OF CORRECTION

PATENT NO. : 7,104,561 B1
APPLICATION NO. : 09/525741
DATED : September 12, 2006
INVENTOR(S) : Paul John Griffiths It is certified that error appears in the above-identified patent and that said Letters Patent is hereby corrected as shown below:

On the Title Page:

Inventor Griffiths' Name Should Read As Follows:

(75) Inventor: Paul John Griffiths, Chester (GB)

Signed and Sealed this

Twelfth Day of December, 2006

JON W. DUDAS
*Director of the United States Patent and Trademark Office*